United States Patent
Yamamoto (10) Patent No.: US 9,352,723 B2
(45) Date of Patent: May 31, 2016

(54) THEFT PREVENTION DEVICE AND THEFT PREVENTION METHOD

(71) Applicant: HONDA MOTOR CO., LTD., Tokyo (JP)

(72) Inventor: Naoto Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/226,001

(22) Filed: Mar. 26, 2014

(65) Prior Publication Data

US 2014/0297154 A1    Oct. 2, 2014

(30) Foreign Application Priority Data

Mar. 28, 2013    (JP) .................................. 2013-068453

(51) Int. Cl.
| | |
|---|---|
| *G06F 19/00* | (2011.01) |
| *G06G 7/70* | (2006.01) |
| *B60R 25/04* | (2013.01) |
| *B60W 10/06* | (2006.01) |
| *B60K 1/02* | (2006.01) |

(52) U.S. Cl.
CPC ................ *B60R 25/04* (2013.01); *B60W 10/06* (2013.01); *B60K 1/02* (2013.01)

(58) Field of Classification Search
USPC ............. 701/99, 22, 36; 340/5.2, 425.5, 5.26, 340/5.72, 426.1, 5.8, 428, 13, 426.11, 5.81, 340/5.82; 307/10.2, 10.3; 180/287, 65.265; 235/382; 455/411
See application file for complete search history.

(56) References Cited

U.S. PATENT DOCUMENTS

| | | | | |
|---|---|---|---|---|
| 6,225,889 | B1* | 5/2001 | Furuta et al. | 340/426.36 |
| 8,150,573 | B2* | 4/2012 | Shimizu | B60R 25/241 701/22 |
| 8,299,891 | B2* | 10/2012 | Yamamoto et al. | 340/5.26 |
| 2004/0210757 | A1* | 10/2004 | Kogan et al. | 713/182 |
| 2004/0242201 | A1* | 12/2004 | Sasakura | A47G 29/141 455/411 |
| 2006/0223500 | A1* | 10/2006 | Osugi et al. | 455/411 |
| 2007/0001805 | A1* | 1/2007 | Utter et al. | 340/5.72 |
| 2007/0158414 | A1* | 7/2007 | Sasakura | A47G 29/141 235/380 |

(Continued)

FOREIGN PATENT DOCUMENTS

| | | |
|---|---|---|
| JP | 2003-212093 | 7/2003 |
| JP | 2011-225067 | 11/2011 |

OTHER PUBLICATIONS

Traffic image authentication based on pinned sine transform; Ho, A.T.S. ; Xunzhan Zhu; Imaging for Crime Detection and Prevention, 2005. ICDP 2005. The IEE International Symposium on; DOI: 10.1049/ic:20050068; Publication Year: 2005 , pp. 45-48.*

(Continued)

*Primary Examiner* — Cuong H Nguyen
(74) *Attorney, Agent, or Firm* — Rankin, Hill & Clark LLP (57) ABSTRACT

A theft prevention device includes an FI-ECU that controls starting of an engine, a BCM that performs first code authentication between the BCM and the FI-ECU, a voltage detection unit that detects a voltage supplied from a power supply to the FI-ECU or the BCM, and a control unit that performs second code authentication with the BCM and controls a device VSA that is different from the FI-ECU. The BCM performs authentication with the control unit only when the voltage detected by the voltage detection unit indicates a predetermined value or less.

6 Claims, 7 Drawing Sheets

(56) References Cited

U.S. PATENT DOCUMENTS

| | | | |
|---|---|---|---|
| 2008/0218322 A1* | 9/2008 | Shii | 340/426.11 |
| 2009/0278698 A1* | 11/2009 | Kamiki | 340/576 |
| 2010/0049385 A1 | 2/2010 | Bamba | |
| 2010/0052845 A1* | 3/2010 | Yamamoto et al. | 340/5.8 |
| 2010/0235026 A1* | 9/2010 | Shimizu | B60R 25/241 701/22 |

OTHER PUBLICATIONS

ProtoMon: embedded monitors for cryptographic protocol intrusion detection and prevention; Joglekar, S.P. ; Tate, S.R. Information Technology: Coding and Computing, 2004. Proceedings. ITCC 2004. International Conference on; vol. 1; DOI: 10.1109/ITCC.2004. 1286430; Publication Year: 2004 , pp. 81-88 vol. 1.*

Detecting double compressed JPEG images; Mahdian, B. ; Saic, S.; Crime Detection and Prevention (ICDP 2009), 3rd International Conference on; DOI: 10.1049/ic.2009.0240; Publication Year: 2009 , pp. 1-6.*

A DCT quantization-based image authentication system for digital forensics; I-Chuan Chang ; Bor-Wen Hsu ; Chi Sung Laih; Systematic Approaches to Digital Forensic Engineering, 2005. First International Workshop on DOI: 10.1109/SADFE.2005.1; Publication Year: 2005 , pp. 223-235.*

Apparatus for Ensuring Seat Belt Usage and Checking Blood Alcohol Concentration; Bhatnagar, S.; Gupta, R.; Kumar Singla, K. Robotics, Automation and Mechatronics, 2008 IEEE Conference on; Year: 2008; pp. 353-357, DOI: 10.1109/RAMECH.2008.4681330.*

Next generation auto theft prevention and tracking system for land vehicles; Bavya, R.; Mohanamurali, R. ; Information Communication and Embedded Systems (ICICES), 2014 International Conference on; Year: 2014 ; pp. 1-5, DOI: 10.1109/ICICES.2014.7033987.*

Video Framerate, Resolution and Grayscale Tradeoffs for Undersea Telemanipulator Control; Ranadive, V.; Sheridan, T.B. OCEANS 81; Year: 1981; pp. 1222-1222, DOI: 10.1109/OCEANS.1981. 1151520.*

Network constrained transactive control for electric vehicles integration; J. Hu; Guangya Yang; H. W. Bindner; Power & Energy Society General Meeting, 2015 IEEE; Year: 2015; pp. 1-5, DOI: 10.1109/ PESGM.2015.7286174.*

Impact of electric vehicles on household voltage profiles and possible mitigation approach; W. Khamphanchai; M. Pipattanasomporn; S. Rahman; A. T. Al-Awami ; Innovative Smart Grid Technologies Conference Europe (ISGT-Europe), 2014 IEEE PES; Year: 2014; pp. 1-6, DOI: 10.1109/ISGTEurope.2014.7028988.*

Battery choice and management for new-generation electric vehicles; A. Affanni; A. Bellini; G. Franceschini; P. Guglielmi; C. Tassoni; IEEE Transactions on Industrial Electronics ; Year: 2005, vol. 52, Issue: 5; pp. 1343-1349, DOI: 10.1109/TIE.2005.855664.*

Microcomputer Control of Variable Frequency Drives Using the Submersible Motor as an Instrument ; W. D. Dickson; J. E. McClain IEEE Transactions on Industry Applications; Year: 1982, vol. IA-18, Issue: 4; pp. 373-381, DOI: 10.1109/TIA.1982.4504096.*

Japanese Office Action dated Jan. 27, 2015, 2 pages.

German Search Report with English Translation dated Jul. 23, 2015, 17 pages.

* cited by examiner

THEFT PREVENTION DEVICE AND THEFT PREVENTION METHOD

BACKGROUND

1. Technical Field

The present invention relates to a theft prevention device and a theft prevention method for a vehicle, in particular to a theft prevention device and a theft prevention method which prevent a vehicle from being stolen by performing authentication before starting the vehicle.

2. Related Art

In recent years, many vehicle thefts occur, so that movement to employ legal regulations related to a vehicle theft prevention system rises. In Canada, 5-minute attack test performance criterion is proposed and it is required that an engine does not start even if a vehicle theft prevention system is attacked for five minutes.

As a vehicle theft method, there is a method of replacing all related devices such as an immobilizer that performs authentication related to theft prevention. In order to prevent theft even in this method, a technique that significantly limits functions of a vehicle is disclosed (see Japanese Patent No. 3832347).

SUMMARY

However, it is not appropriate to take measures to limit network function and reduce commercial value of the vehicle because if a related component fails, there will be a significant impact.

On the other hand, if the number of devices that perform authentication is increased, there is limitation of communication time required for the authentication because the authentication is performed every time a driver uses the vehicle. It is required to construct a new system that achieves both reliability and convenience in normal use.

A theft prevention device of the present invention includes: an engine control unit configured to control starting of an engine; an authentication control unit configured to perform first code authentication between the authentication control unit and the engine control unit; an voltage detection unit configured to detect a voltage supplied from a power supply to the engine control unit or the authentication control unit; and a first control unit configured to perform second code authentication with the authentication control unit and control a device different from the engine control unit, wherein the authentication control unit performs authentication with the first control unit only when the voltage detected by the voltage detection unit indicates a predetermined value or less.

According to one aspect of the present invention, the first control unit is connected to a network which is different from a circuit of the engine control unit and the authentication control unit and to which another control unit is connected.

According to another aspect of the present invention, the other control unit included in each of a plurality of devices is connected to the network, and the authentication control unit performs the second code authentication with a predetermined control unit among the first control unit and the other control units through the network every time it is detected that the voltage becomes lower than or equal to a predetermined value.

Further, the present invention provides a theft prevention method performed by an authentication control unit that performs first code authentication between the authentication control unit and an engine control unit, the method including: a step of detecting a voltage supplied from a power supply; and a step of performing second code authentication with a first control unit that controls a device different from the engine control unit only when a result of the detection is lower than or equal to a predetermined value.

According to the theft prevention device and the theft prevention method of the present invention, theft prevention capability and reliability of the vehicle improve without hampering convenience in normal use.

DETAILED DESCRIPTION

Hereinafter, embodiments of the present invention will be described with reference to the drawings.

The theft prevention device and the theft prevention method according to the embodiments described below have a configuration in which authentication with a related device (such as VSA, SRS, and Meter) connected through a network different from an original authentication network is performed only when a power supply of a device related to the authentication is turned off and then turned on again.

First Embodiment

Figure 1:
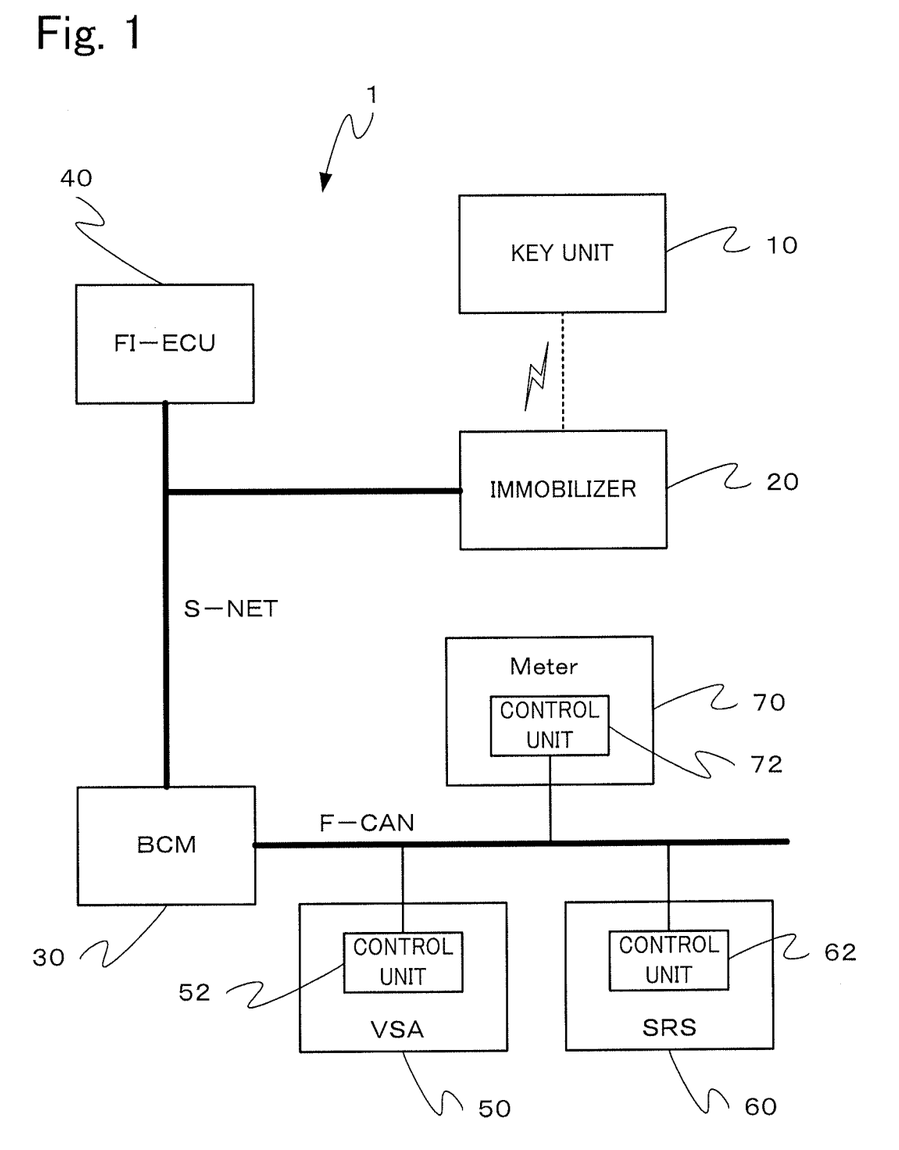
FIG. 1 is a block diagram showing a configuration of a theft prevention device according to a first embodiment of the present invention.

FIG. 1 is a block diagram showing a configuration of a theft prevention device according to a first embodiment of the present invention.

The theft prevention device 1 includes a key unit 10, an immobilizer 20, a BCM (Body Control Module) 30, a FI-ECU (Fuel Injection Electronic Control Unit) 40, a VSA (Vehicle Stability Assist) 50, an SRS (Supplemental Restraint System) 60, and a Meter 70.

The key unit 10 holds an ID (identification) of a key, which is identification information. When a mechanical key is inputted, the key unit 10 outputs the ID of the key. The ID of the key is unique for each vehicle and is encrypted.

The immobilizer 20 is a device that prevents an engine from starting without a dedicated key ID by an electronic key collation system. The immobilizer 20 electronically collates an ID code of a unique key, which is held by an electronic chip called a transponder and transmitted from the key unit 10, with an ID code of the vehicle and does not start the engine unless the ID codes correspond to each other.

The BCM 30 is an abbreviation of a body control module. The BCM 30 is a device which is mounted in a body and performs multifunctional control such as authentication control, an authentication operation with the immobilizer 20, a gateway function of each connected network, and control related to interior. The BCM 30 further has a function of an MICU (multiplex integrated control unit, multifunctional integrated control device).

The FI-ECU 40 is an engine control unit that controls starting of the engine. The FI-ECU 40 is an electronic control device that controls fuel supplied to the engine and the FI-ECU 40 controls an operation for actually starting and stopping the engine.

The VSA 50 is a device for preventing slip. The VSA 50 is a device that makes it difficult to exceed a limit in all fields of "driving, turning, and stopping" by providing a "slope" at a limit of a gripping force of a tire.

The SRS 60 is a device that secondarily restrains an occupant who is mainly restrained by a seat belt at time of crash.

The Meter 70 is a meter cluster, which is a device containing measuring instruments such as a speed meter and a tachometer.

The key unit 10 and the immobilizer 20 wirelessly communicate with each other.

Each of the immobilizer 20, the BCM 30, and the FI-ECU 40 includes a control unit inside thereof. Each control unit stores and holds a unique random ID. Each control unit is connected to each other by an S-NET, which is a network using a dedicated protocol.

The immobilizer 20, the BCM 30, and the FI-ECU 40 perform code authentication using an ID.

The VSA 50, the SRS 60, and the Meter 70 include control units 52, 62, and 72, respectively, inside thereof. Each of the control units 52, 62, and 72 stores and holds a unique random ID. The control units 52, 62, and 72 are connected to each other by an F-CAN (Fast Controller Area Network) that is a network different from the S-NET which uses a dedicated protocol.

The control unit 52 of the VSA 50, the control unit 62 of the SRS 60, and the control unit 72 of the Meter 70 perform code authentication using ID between them and the BCM 30.

Figure 2:
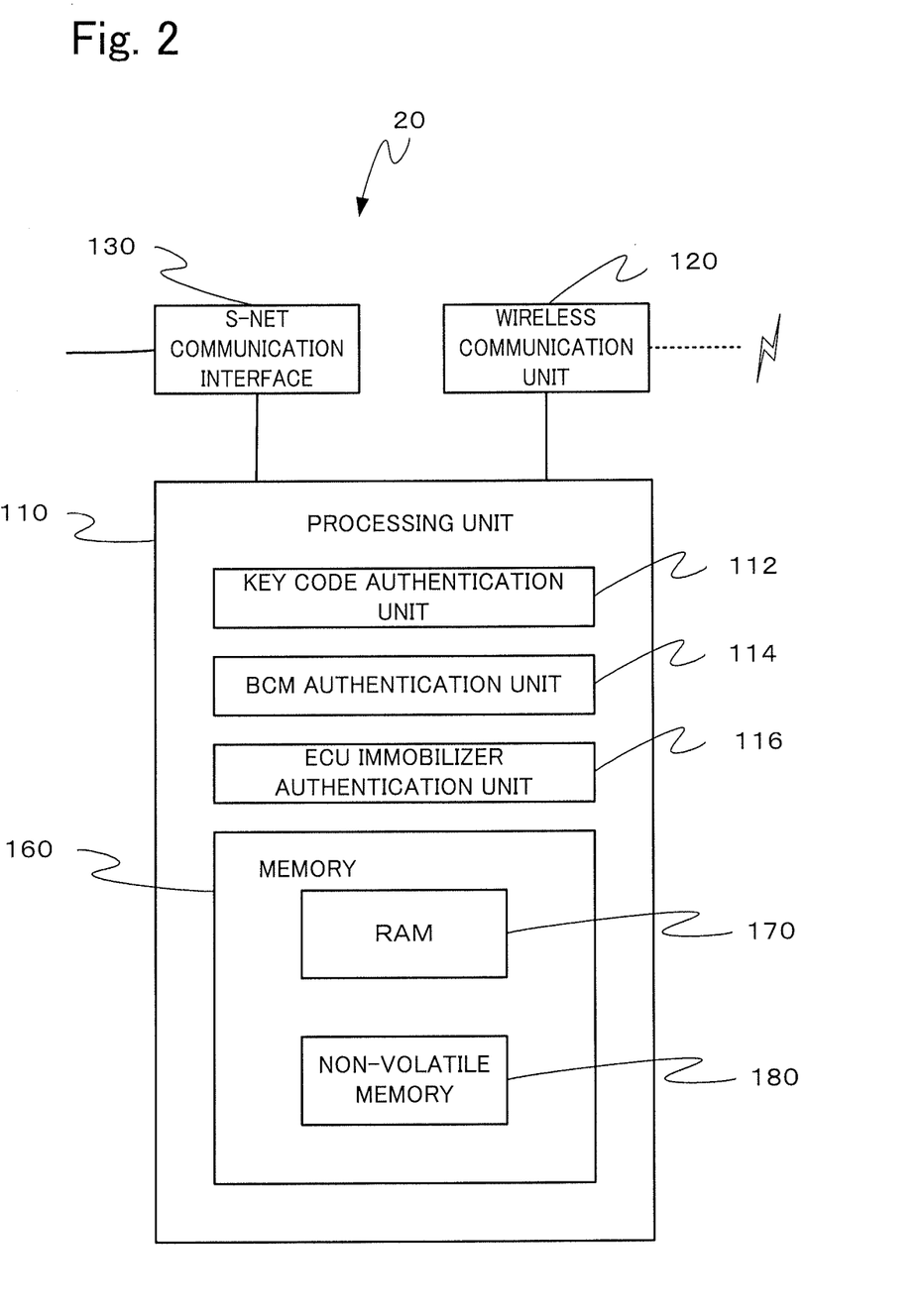
FIG. 2 is a block diagram showing a configuration of an immobilizer included in the theft prevention device according to the first embodiment of the present invention.

Next, the immobilizer 20 will be described in detail.

FIG. 2 is a block diagram showing a configuration of the immobilizer included in the theft prevention device according to the first embodiment of the present invention.

The immobilizer 20 includes a processing unit 110 which is one of authentication control units, a wireless communication unit 120, and an S-NET communication interface 130.

The wireless communication unit 120 wirelessly communicates with the key unit 10. The S-NET communication interface 130 communicates with the BCM 30 and the FI-ECU 40 through the S-NET.

The processing unit 110 is a computer including a processor such as a CPU (Central Processing Unit), a ROM (Read Only Memory) in which a program is written, and a memory 160 for storing data. As the memory 160 for storing data, two types of memories are provided, which are a RAM (Random Access Memory) 170 in which stored data disappears when the power supply is turned off and a non-volatile memory 180 which holds stored data even when the power supply is turned off.

The non-volatile memory 180 stores the ID of the key unit 10, the ID of each of the BCM 30 and the FI-ECU 40 connected to the S-NET, and the ID of the immobilizer 20 itself.

The processing unit 110 includes a key code authentication unit 112, a BCM authentication unit 114, and an ECU immobilizer authentication unit 116. Each of the aforementioned units included in the processing unit 110 is implemented by a program executed by the processing unit 110 which is a computer and the computer program can be stored in any computer-readable storage medium.

Each unit included in the processing unit 110 may be formed as dedicated hardware including one or more electrical components.

The key code authentication unit 112 communicates with the key unit 10 through the wireless communication unit 120 and performs code authentication using ID.

The BCM authentication unit 114 communicates with the BCM 30 through the S-NET communication interface 130 and performs code authentication using ID.

The ECU immobilizer authentication unit 116 communicates with the FI-ECU 40 through the S-NET communication interface 130 and performs code authentication using ID.

Figure 3:
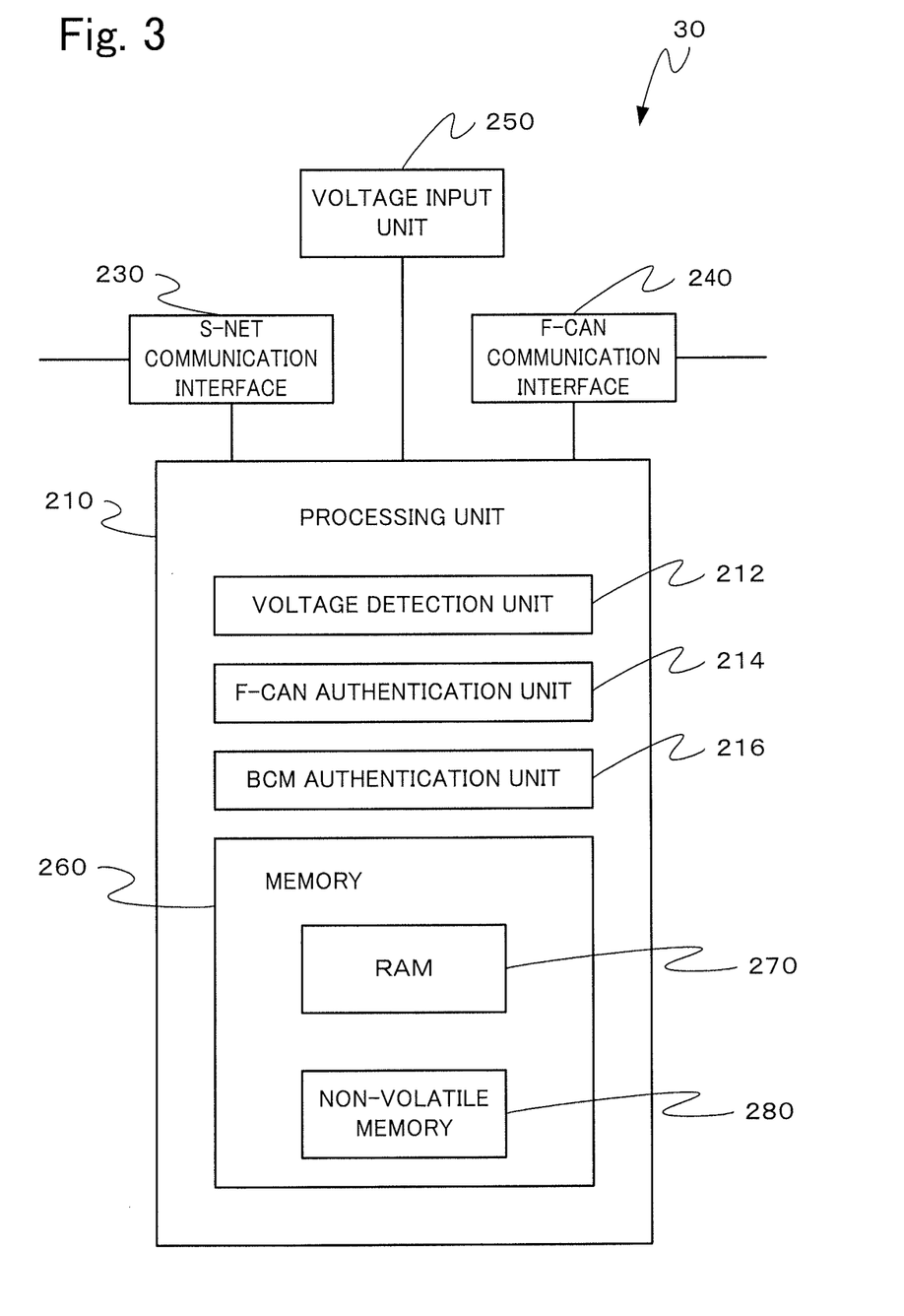
FIG. 3 is a block diagram showing a configuration of a BCM included in the theft prevention device according to the first embodiment of the present invention.

Next, the BCM 30 will be described in detail.

FIG. 3 is a block diagram showing a configuration of the BCM included in the theft prevention device according to the first embodiment of the present invention.

The ECM 30 includes an authentication control unit processing unit 210, an S-NET communication interface 230, an F-CAN communication interface 240, and a voltage input unit 250.

The S-NET communication interface 230 communicates with the immobilizer 20 and the FI-ECU 40 through the S-NET. The F-CAN communication interface 240 communicates with the VSA 50 and the like through the F-CAN.

The voltage input unit 250 inputs a supplied voltage level.

The processing unit 210 is a computer including a processor such as a CPU (Central Processing Unit), a ROM (Read Only Memory) in which a program is written, and a memory 260 for storing data. As the memory 260 for storing data, two types of memories are provided, which are a RAM (Random Access Memory) 270 in which stored data disappears when the power supply is turned off and a non-volatile memory 280 which holds stored data even when the power supply is turned off.

The non-volatile memory 280 stores the ID of each of the VSA 50, the SRS 60, and the Meter 70 connected to the F-CAN, the ID of each of the immobilizer 20 and the FI-ECU 40 connected to the S-NET, and the ID of the BCM 30 itself. Further, the non-volatile memory 280 stores a start process flag indicating that a start process described later is performed.

The processing unit 210 includes a voltage detection unit 212, an F-CAN authentication unit 214, and a BCM authentication unit 216. Each of the aforementioned units included in the processing unit 210 is implemented by a program executed by the processing unit 210 which is a computer and the computer program can be stored in any computer-readable storage medium.

Each unit included in the processing unit 210 may be formed as dedicated hardware including one or more electrical components.

The voltage detection unit 212 is a unit that detects whether or not a voltage supplied from a battery (not shown in the drawings), which is a power supply, becomes lower than or equal to a predetermined voltage lower than a normal voltage range.

The voltage from the battery is supplied to the BCM 30 at all times including a period in which the engine is not rotated. When the battery is replaced or the BCM 30 itself is removed, the voltage level from the voltage input unit 250 becomes lower than or equal to the predetermined voltage. Once it is detected that the voltage level becomes lower than or equal to the predetermined voltage, the voltage detection unit 212 performs the start process and stores the start process flag in the non-volatile memory 280. The start process flag is cleared when an F-CAN code authentication described later becomes OK. The voltage detection unit 212 checks the start process flag to detect whether or not the voltage supplied from the battery is discontinued.

If the voltage supplied from the battery is discontinued, data in the RAM 270, which is not non-volatile, disappears. The voltage detection unit 212 may check that the data in the RAM 270 has disappeared to detect whether or not the voltage supplied from the battery is discontinued.

The F-CAN authentication unit 214 communicates with the control unit 52 of the VSA 50, the control unit 62 of the SRS 60, and the control unit 72 of the Meter 70 which are connected by the F-CAN through the F-CAN communication interface 240 and performs code authentication using ID.

The BCM authentication unit 216 communicates with the immobilizer 20 through the S-NET communication interface 130 and performs code authentication using ID.

Authentication Operation Procedure

Next, an authentication operation procedure of the theft prevention device 1 will be described.

Figure 4:
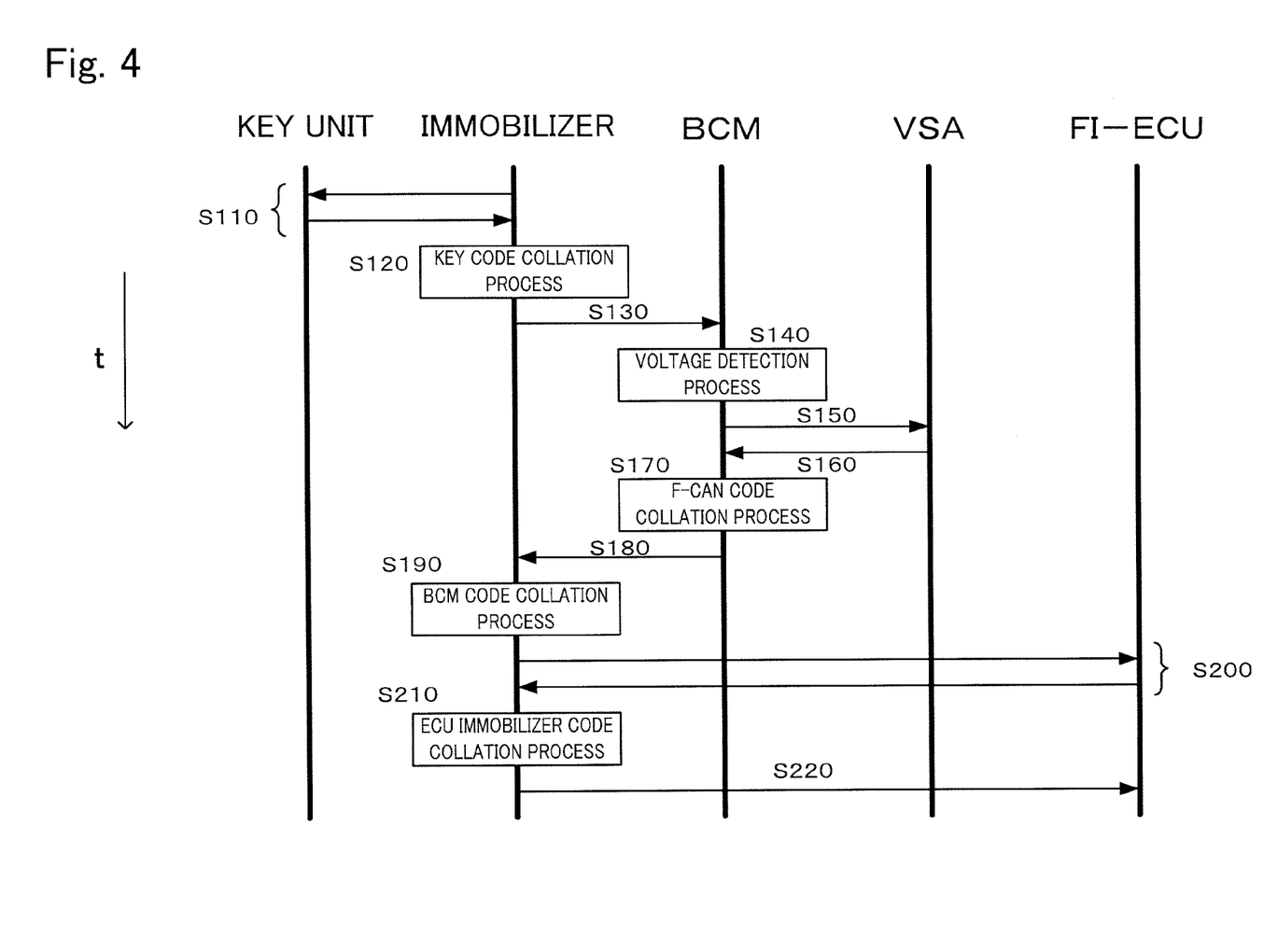
FIG. 4 is a sequence diagram showing an authentication operation procedure of the theft prevention device according to the first embodiment of the present invention.

FIG. 4 is a sequence diagram showing the authentication operation procedure of the theft prevention device according to the first embodiment of the present invention. The procedure proceeds as time elapses in a direction indicated by an arrow t in FIG. 4.

In FIG. 4, step S110 and step S120 are a key code authentication process.

When a mechanical key is inserted into the key unit 10 and an ignition-on instruction is transmitted, the key unit 10 and the immobilizer 20 perform code authentication using ID (a key authentication communication step, S110). First, the immobilizer 20 requests the key unit 10 to perform authentication. The key unit 10 transmits an ID, which is a code unique to the key and held by the key unit 10, to the immobilizer 20. The above communication is performed using a radio wave. Next, the process proceeds to a key code collation process (S120).

In the key code collation process (S120), the key code authentication unit 112 collates the ID of the key unit held in the non-volatile memory 180 with the transmitted ID. As a result, if the IDs are not matched, the key code authentication unit 112 determines that the key code authentication is NG and does not proceed to the next step but ends the process. As a result of the collation, if the IDs are matched, the key code authentication unit 112 determines that the key code authentication is OK and proceeds to the next step, which is a BCM authentication request step (S130).

Steps from step S130 to step S190 are a BCM code authentication process.

In the BCM authentication request step (S130), the BCM authentication unit 114 transmits an authentication request to the BCM 30 to perform authentication through the S-NET communication interface 130. Next, the process proceeds to a voltage detection process (S140).

In the voltage detection process (S140), as described above, the voltage detection unit 212 of the BCM 30, which is requested to perform authentication, determines whether or not the voltage supplied from the battery is discontinued by checking whether there is the start process flag stored the non-volatile memory 280 or by checking whether the data in the RAM 270 has disappeared. If the voltage is not discontinued, the process proceeds to a BCM authentication result return step (S180).

If detecting that the voltage is discontinued, the BCM 30 detects that the BCM 30 itself may be removed from the vehicle. Therefore, the BCM 30 sends an inquiry by using another network to check that the BCM 30 itself is not removed from the vehicle. Thus, the process proceeds to an ID request via F-CAN step (S150).

The ID request via F-CAN step (S150), an ID return via F-CAN step (S160), and an F-CAN code collation process (S170) are processes in which F-CAN code authentication, which is second code authentication, is performed between the F-CAN authentication unit 214 and the control units 52, 62, and 72 of the devices connected to the F-CAN.

In the ID request via F-CAN step (S150), the F-CAN authentication unit 214 randomly determines a device which is requested to perform authentication from among the VSA 50, the SRS 60, and the Meter 70 which are devices connected to the F-CAN. For example, the F-CAN authentication unit 214 generates a random number and determines the device which is requested to perform authentication on the basis of the generated random number. As a result, if the VSA 50 is determined as the device, the F-CAN authentication unit 214 requests the VSA 50 to perform authentication. Hereinafter, a case in which the F-CAN authentication unit 214 requests the VSA 50 to perform authentication will be described.

The F-CAN authentication unit 214 transmits an authentication request to the control unit 52 of the VSA 50 through the F-CAN communication interface 240. Next, the process proceeds to the ID return via F-CAN step (S160).

In the ID return via F-CAN step (S160), the control unit 52 of the VSA 50 returns the held ID of the VSA 50 itself to the BCM 30.

If the F-CAN authentication unit 214 does not receive a return from the VSA 50 for a predetermined period of time, for example, 200 ms, from when transmitting the authentication request to the VSA 50, the F-CAN authentication unit 214 performs a retry operation for transmitting the authentication request again to the VSA 50.

Next, the process proceeds to the F-CAN code collation process (S170).

In the F-CAN code collation process (S170), first, if there is no return even if performing the retry operation a predetermined number of times, for example, three times, the F-CAN authentication unit 214 determines that the F-CAN code authentication is NG.

If the ID is returned from the VSA 50, the F-CAN authentication unit 214 collates the ID of the VSA 50 held in the non-volatile memory 280 with the returned ID. As a result, if the IDs are not matched, the F-CAN authentication unit 214 determines that the F-CAN code authentication is NG. In this case, the F-CAN code authentication does not transmit the authentication request again. As a result of the collation, if the IDs are matched, the F-CAN authentication unit 214 determines that the F-CAN code authentication is OK.

If the F-CAN code authentication is OK, the F-CAN authentication unit 214 clears the start process flag stored in the non-volatile memory 280. Thereby, on the next time and thereafter, the process can proceed to the BCM authentication result return step (S180) without performing the F-CAN code collation process, so that it is possible to reduce the entire processing time.

The device which is requested to perform authentication in step S150 and transmits a return of the authentication in step S160 need not be one randomly selected device, but may be two devices connected to the F-CAN, may be selected according to a predetermined order, or may be a predetermined device. When performing the F-CAN code authentication on two devices, the F-CAN code authentication is not determined to be OK unless the IDs are matched for each of the two devices.

Next, the process proceeds to the BCM authentication result return step (S180).

In the BCM authentication result return step (S180), if the voltage of the BCM 30 is not discontinued or the result of the F-CAN code authentication is OK, the BCM authentication unit 216 returns the ID of the BCM 30 itself held in the non-volatile memory 280 to the immobilizer 20. Next, the process proceeds to a BCM code collation process (S190) performed by the immobilizer 20.

If the result of the F-CAN code authentication is NG, the BCM authentication unit 216 does not transmit a return to the immobilizer 20. As a result, the process does not proceed to the next step, that is, the BCM code collation process (S190), so that the engine is still in a stopped state.

In the BCM code collation process (S190), the BCM authentication unit 114 of the immobilizer 20 does nothing unless receiving a return from the BCM 30. As a result, the process does not proceed to the next step, that is, an ECU immobilizer authentication communication step (S200), so that the engine is still in a stopped state.

If the ID of the BCM 30 is returned from the BCM 30, the BCM authentication unit 114 collates the returned ID with the ID of the BCM 30 held in the non-volatile memory 180 by the immobilizer 20. As a result, if the IDs are not matched, the BCM authentication unit 114 determines that the BCM code authentication is NG and ends the process. As a result of the collation, if the IDs are matched, the BCM authentication unit 114 determines that the BCM code authentication is OK and proceeds to the ECU immobilizer authentication communication step (S200).

The ECU immobilizer authentication communication step (S200) and an ECU immobilizer code collation process (S210) are an ECU immobilizer authentication process, which is a first code authentication.

In the ECU immobilizer authentication communication step (S200), the ECU immobilizer authentication unit 116 transmits the ID of the immobilizer 20 itself held in the non-volatile memory 280 to the FI-ECU 40.

The FI-ECU 40 collates the ID with the ID of the immobilizer 20 held inside the FI-ECU 40. As a result, if the IDs are not matched, the FI-ECU 40 determines that the ECU immobilizer code authentication is NG and ends the process. As a result of the collation, if the IDs are matched, the FI-ECU 40 transmits the ID of the FI-ECU 40 itself to the immobilizer 20. Next, the process proceeds to the ECU immobilizer code collation process (S210).

In the ECU immobilizer code collation process (S210), if the ID of the FI-ECU 40 is returned, the ECU immobilizer authentication unit 116 collates the returned ID with the ID of the FI-ECU 40 held in the non-volatile memory 180. As a result, if the IDs are not matched, the ECU immobilizer authentication unit 116 determines that the ECU immobilizer code authentication is NG and ends the process. As a result of the collation, if the IDs are matched, the ECU immobilizer authentication unit 116 determines that the ECU immobilizer code authentication is OK.

In this way, the immobilizer 20 and the FI-ECU 40 perform mutual authentication. If the result is OK, all the authentications are determined to be OK.

If the ECU immobilizer code authentication is OK, the ECU immobilizer authentication unit 116 transmits the result of the ECU immobilizer code authentication to the FI-ECU 40 (S220). The FI-ECU 40 receives the result and starts the engine.

In the present embodiment, the immobilizer 20 performs the key code authentication by authenticating the ID of the key unit 10. However, mutual authentication may be performed in which the key unit 10 also authenticates the ID of the immobilizer 20.

In this case, the immobilizer 20 transmits an ID request as well as the held ID of the immobilizer 20 itself to the key unit 10. The key unit 10 collates the ID of the immobilizer 20 held by the key unit 10 with the received ID. As a result, if the IDs are not matched, the key unit 10 does not return the ID of the key unit 10 itself to the immobilizer 20. As a result of the collation, if the IDs are matched, the key unit 10 returns the ID of the key unit 10 itself to the immobilizer 20.

If the key unit 10 authenticates the immobilizer 20, the immobilizer 20 may omit the authentication of the key unit 10. This is because the authentication between the key unit 10 and the immobilizer 20 can be performed if one of the key unit 10 and the immobilizer 20 authenticates the other.

In the same manner, while the BCM 30 authenticates the ID of the VSA 50, mutual authentication may be performed in which the VSA 50 also authenticates the ID of the BCM 30.

In the same manner, while the immobilizer 20 authenticates the ID of the BCM 30, mutual authentication may be performed in which the BCM 30 also authenticates the ID of the immobilizer 20.

In the present embodiment, although the BCM 30 detects the voltage, another unit such as the FI-ECU 40 or the immobilizer 20 may detect the voltage. When the FI-ECU 40 detects the voltage, the FI-ECU 40 includes the same unit as the voltage input unit 250. In the voltage detection process (S140), the voltage detection unit 212 requests the FI-ECU 40 to provide information indicating whether or not the voltage supplied from the battery is discontinued. The FI-ECU 40 performs the same process as the voltage detection process (S140) of the BCM 30 described above and determines the voltage. The FI-ECU 40 returns the determination result to the ECM 30 and the voltage detection unit 212 determines whether or not to proceed to the next step, that is, the ID request via F-CAN step (S150), on the basis of the received determination result.

Second Embodiment

Figure 5:
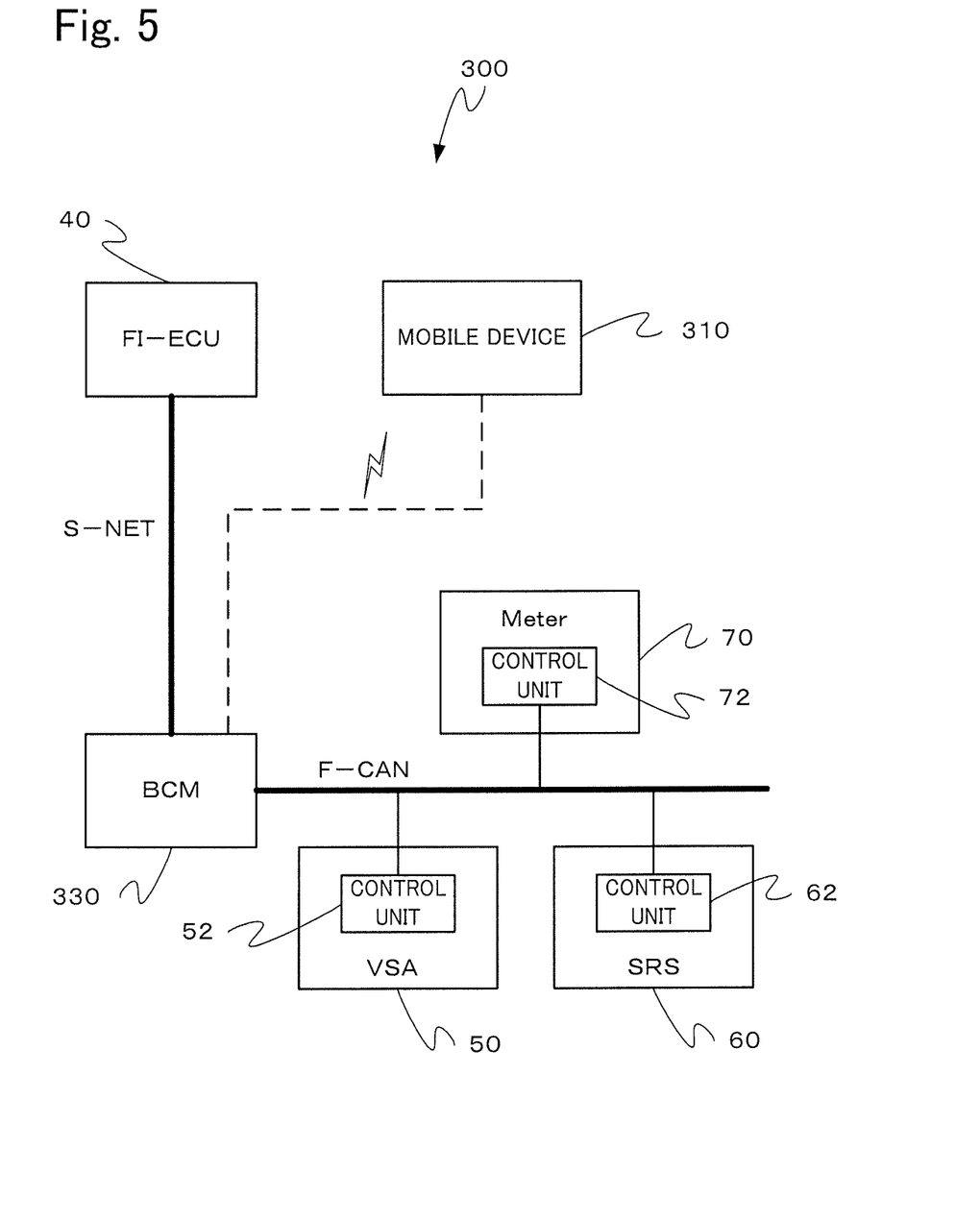
FIG. 5 is a block diagram showing a configuration of a theft prevention device according to a second embodiment of the present invention.

FIG. 5 is a block diagram showing a configuration of a theft prevention device according to a second embodiment of the present invention.

The same components as those in the first embodiment shown in FIG. 1 are denoted by the same reference numerals as those in FIG. 1. The description of FIG. 1 is used for the components denoted by the same reference numerals as those in FIG. 1.

Although a theft prevention device 300 has a configuration similar to that of the theft prevention device 1 according to the first embodiment shown in FIG. 1, the theft prevention device 300 is different from the theft prevention device 1 in that the theft prevention device 300 includes a mobile device 310 instead of the key unit 10 and a BCM 330 has the function of the immobilizer 20 too.

The present embodiment is a form of specification referred to as a smart entry intelligent key.

Instead of a mechanical key, there is a mobile device 310 held by a driver. An immobilizer is integrated into the BCM 330. Communication is performed between the mobile device 310 and the BCM 330 mounted in a vehicle, and if the communication is established, doors are locked or unlocked.

Figure 6:
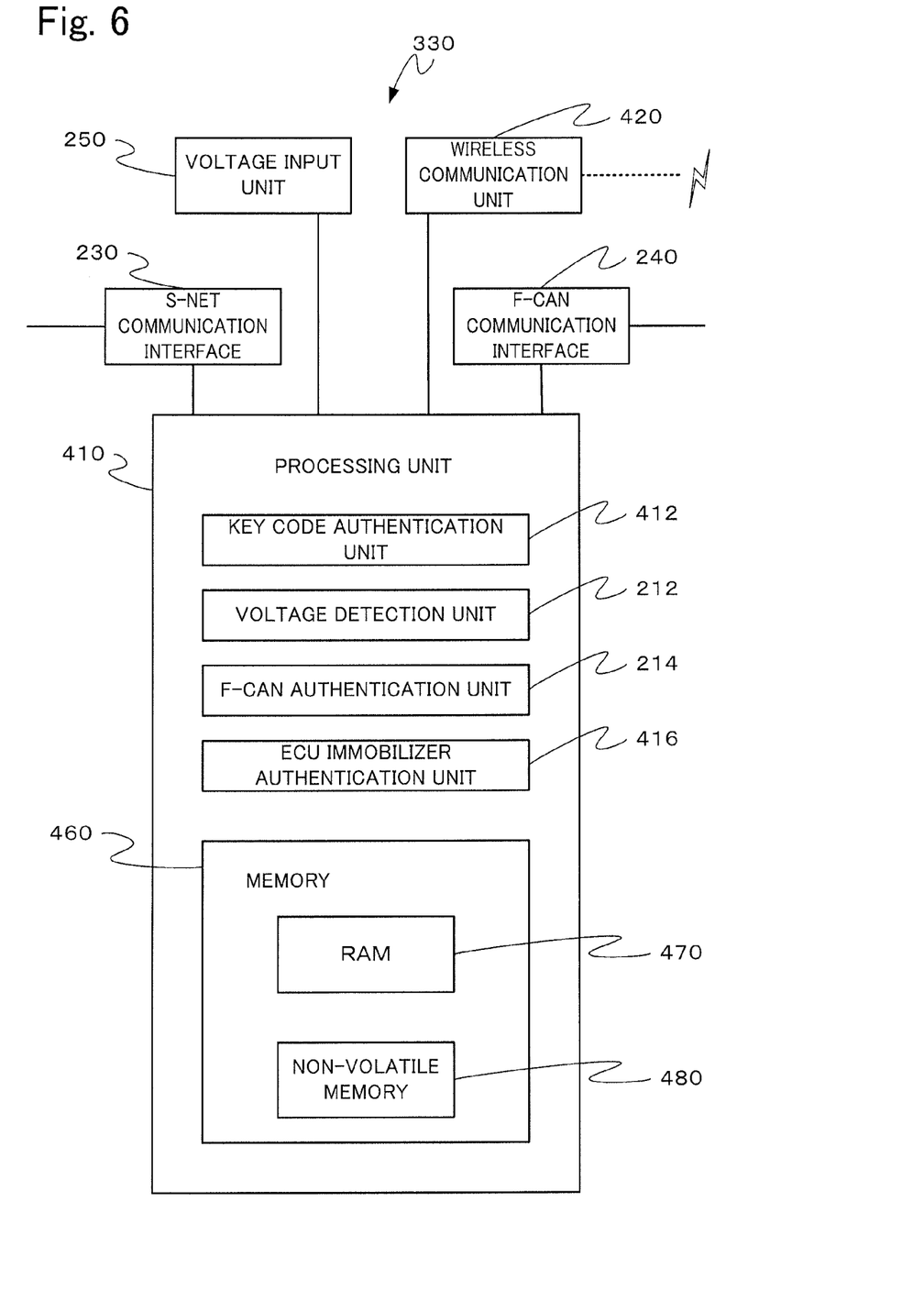
FIG. 6 is a block diagram showing a configuration of a BCM included in the theft prevention device according to the second embodiment of the present invention.

Next, a configuration of the BCM 330 will be described.

FIG. 6 is a block diagram showing the configuration of the BCM included in the theft prevention device according to the second embodiment of the present invention.

The same components as those in the immobilizer 20 and the BCM 30 according to the first embodiment shown in FIGS. 2 and 3 are denoted by the same reference numerals as those in FIGS. 2 and 3. The descriptions of FIGS. 2 and 3 are used for the components denoted by the same reference numerals as those in FIGS. 2 and 3.

The BCM 330 has both configurations of the immobilizer 20 and the BCM 30 according to the first embodiment.

The BCM 330 includes a processing unit 410 which is an authentication control unit, a wireless communication unit 420, an S-NET communication interface 230, an F-CAN communication interface 240, and a voltage input unit 250.

The wireless communication unit 420 wirelessly communicates with the mobile device 310.

The processing unit 410 is a computer including a processor such as a CPU (Central Processing Unit), a ROM (Read Only Memory) in which a program is written, and a memory 460 for storing data. As the memory 460 for storing data, two types of memories are provided, which are a RAM (Random Access Memory) 470 in which stored data disappears when the power supply is turned off and a non-volatile memory 480 which holds stored data even when the power supply is turned off.

The non-volatile memory 480 stores an ID of the mobile device 310, the ID of each of the VSA 50, the SRS 60, and the Meter 70 connected to the F-CAN, the ID of the FI-ECU 40 connected to the S-NET, and the ID of the BCM 430 itself. Further, the non-volatile memory 480 stores the start process flag indicating that the start process is performed.

The processing unit 410 includes a key code authentication unit 412, the voltage detection unit 212, the F-CAN authentication unit 214, and an ECU immobilizer authentication unit 416. Each of the aforementioned units included in the processing unit 410 is implemented by a program executed by the processing unit 410 which is a computer and the computer program can be stored in any computer-readable storage medium.

Each unit included in the processing unit 410 may be formed as dedicated hardware including one or more electrical components.

The key code authentication unit 412 communicates with the mobile device 310 through the wireless communication unit 420 and performs code authentication using ID.

The ECU immobilizer authentication unit 416 communicates with the FI-ECU 40 through the S-NET communication interface 230 and performs code authentication using ID.

Authentication Operation Procedure

Next, an authentication operation procedure of the theft prevention device 300 will be described.

Figure 7:
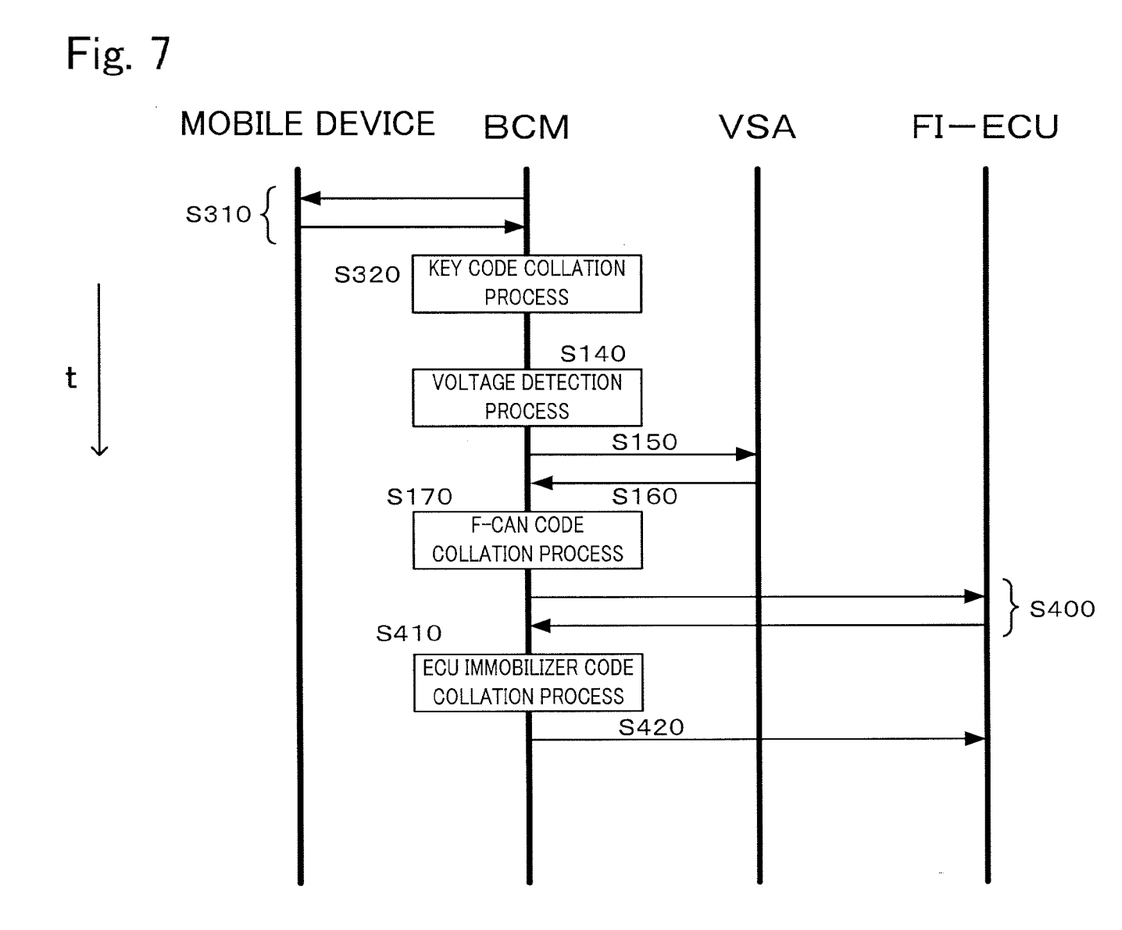
FIG. 7 is a sequence diagram showing an authentication operation procedure of the theft prevention device according to the second embodiment of the present invention.

FIG. 7 is a sequence diagram showing the authentication operation procedure of the theft prevention device according to the second embodiment of the present invention. The procedure proceeds as time elapses in a direction indicated by an arrow t in FIG. 7.

The same steps as those in the operation procedure of the theft prevention device 1 according to the first embodiment shown in FIG. 4 are denoted by the same reference numerals as those in FIG. 4. The description of FIG. 4 is used for the steps denoted by the same reference numerals as those in FIG. 4.

The operation procedure of the theft prevention device 300 is different from the operation procedure (FIG. 4) of the theft prevention device 1 according to the first embodiment in that communication hosts of the steps (S310 and S320) related to the key authentication and the steps (S400 and S410) related to the ECU immobilizer authentication are different and there are not the steps (S130, 5180, and S190) related to the BCM authentication.

In FIG. 7, step S310 and step S320 are the key code authentication process.

When a switch is operated on the mobile device 310 and an ignition-on instruction is transmitted from the mobile device 310 to the BCM 330, the mobile device 310 and the BCM 330 perform code authentication using ID (a key authentication communication step, S310). First, the BCM 330 requests the mobile device 310 to perform authentication. Next, the process proceeds to a key code collation process (S320).

In the key code collation process (S320), the key code authentication unit 412 collates the ID of the mobile device 310 held in the non-volatile memory 480 with the transmitted ID. As a result, if the IDs are not matched, the key code authentication unit 412 determines that the key code authentication is NG and does not proceed to the next step but ends the process. As a result of the collation, if the IDs are matched, the key code authentication unit 412 determines that the key code authentication is OK and proceeds to the next step, which is the voltage detection step (S140).

The processes from the voltage detection step (S140) to the F-CAN code collation process (S170) are the same as those in the operation procedure (FIG. 4) of the theft prevention device 1 according to the first embodiment. The F-CAN code authentication, which is the second code authentication, is performed between the F-CAN authentication unit 214 and the control units 52, 62, and 72 of the devices connected to the F-CAN.

If the authentication is OK as a result of the F-CAN code authentication or the voltage of the BCM 330 is not discontinued, the process proceeds to an ECU immobilizer authentication communication step (S400).

If the authentication is NG as a result of the F-CAN code authentication, nothing is done. As a result, the process does not proceed to the next step, that is, the ECU immobilizer authentication communication step (S400), so that the engine is still in a stopped state.

The ECU immobilizer authentication communication step (S400) and an ECU immobilizer code collation process (S410) are the ECU immobilizer authentication process, which is the first code authentication.

The BCM 330 has a function of immobilizer too, so that the BCM 330 performs the function of the mutual authentication between the immobilizer 20 and the FI-ECU 40 according to the first embodiment instead of the immobilizer 20.

In the ECU immobilizer authentication communication step (S400), the ECU immobilizer authentication unit 416 transmits the ID of the BCM 330 itself held in the non-volatile memory 480 to the FI-ECU 40.

The FI-ECU 40 collates the ID with the ID of the BCM 330 held inside the FI-ECU 40. As a result, if the IDs are not matched, the FI-ECU 40 determines that the ECU immobilizer authentication is NG and ends the process. As a result of the collation, if the IDs are matched, the FI-ECU 40 transmits the ID of the FI-ECU 40 itself to the BCM 330. Next, the process proceeds to the ECU immobilizer code collation process (S410).

In the ECU immobilizer code collation process (S410), if the ID of the FI-ECU 40 is returned, the ECU immobilizer authentication unit 416 collates the returned ID with the ID of the FI-ECU 40 held in the non-volatile memory 480. As a result, if the IDs are not matched, the ECU immobilizer authentication unit 416 determines that the ECU immobilizer authentication is NG and ends the process. As a result of the collation, if the IDs are matched, in the BCM 330, the ECU immobilizer authentication unit 416 determines that the ECU immobilizer authentication is OK.

In this way, the BCM 330 including the immobilizer function and the FI-ECU 40 perform mutual authentication. If the result is OK, all the authentications are determined to be OK.

If the ECU immobilizer code authentication is OK, the ECU immobilizer authentication unit 416 transmits the result of the ECU immobilizer code authentication to the FI-ECU 40 (S420). The FI-ECU 40 receives the result and starts the engine.

Each example of the mutual authentication and the other examples of voltage detection described in the first embodiment can be applied to the second embodiment too.

Other Embodiments

In the first and the second embodiments, the BCMs 30 and 330 perform authentication on the devices connected to the F-CAN that is a network other than the S-NET that is connected to the FI-ECU 40. However, the network other than the S-NET need not be the F-CAN.

For example, the network other than the S-NET may be LIN (Local Interconnect Network) used for body control such as power window, mirror adjustment, power seat, and door lock, FlexRay which employs a protocol specification that realizes X-by-wire and is mainly used in a control device such as a power train, or TCP/IP.

In addition, there are many networks connected to an in-vehicle LAN. Examples of such networks include a network inside an engine room and a network of an electric motor of a hybrid vehicle. In other words, the device used for the authentication may be a device connected to a network other than the S-NET that is used for the authentication among the immobilizer 20, the BCM 30 or 330, and the FI-ECU 40.

Recently, there is a concern about a vehicle theft technique in which the immobilizer 20, the BCM 30 or 330, and the FI-ECU 40 are replaced together at the same time. However, when the power supply of the BCM 30 or 330 and the like is turned off and then turned on again, if collation communication with devices connected to another network such as the F-CAN is performed, the VSA 50, the SRS 60, and the Meter 70 are also included, so that theft prevention performance is improved.

The theft prevention device according to the embodiments described above includes the voltage detection unit 212 that detects a voltage supplied from the power supply to the FI-ECU 40 or the processing units 110, 210, and 310 and the control unit 52 and the like that control devices other than the FI-ECU 40, performs the first code authentication with the FI-ECU 40, and performs the second code authentication with the control unit 52 and the like only when the voltage detected by the voltage detection unit indicates a predetermined value or less.

If the result of these code authentications is NG, the engine is not started.

Thereby, if a thief tries to steal a vehicle in which the device described in the present embodiments is mounted, the thief cannot start the engine unless the thief replaces not only devices that form a network related to conventional authentication, but also all devices connected to another network such as the F-CAN. Thereby, the theft prevention capability and the reliability are improved.

The code authentication with devices connected to another network such as the F-CAN is performed only when a voltage lower than or equal to a predetermined value is detected, and otherwise, the authentication is not performed. Therefore, normally, the communication time required to perform the authentication is almost unchanged from that of a conventional manner.

The embodiment of the present invention is not limited to the embodiments described above, but may be variously changed without departing from the scope of the present technique.

What is claimed is:

1. A theft prevention device comprising:
   a driving power controller configured to control starting of an engine;
   an authentication controller configured to perform first code authentication between the authentication controller and the driving power controller;
   a voltage detector configured to detect a voltage supplied from a power supply to the driving power controller unit or the authentication controller; and
   a first controller configured to perform second code authentication with the authentication controller and control a device different from the driving power controller,
   wherein the driving power controller is implemented as a first physical device separate from the authentication controller and the first controller, the authentication controller is implemented as a second physical device separate from the driving power controller and the first controller, and the first controller is implemented as a third physical device separate from the driving power controller and the authentication controller,
   wherein the driving power controller initiates starting of driving power on a condition that the driving power controller receives from the authentication controller a signal indicative of a success of authentication, and
   wherein the authentication controller is configured to:
   when the voltage detected by the voltage detector indicates a predetermined value or less,
   perform the second code authentication with the first controller in addition to the first code authentication with the driving power controller, and
   send the signal indicative of the success of authentication to the driving power controller.

2. The theft prevention device according to claim 1, wherein
   the first controller is connected to a network which is different from a circuit of the driving power controller and the authentication controller and to which another controller is connected.

3. The theft prevention device according to claim 2, wherein
   the other controller included in each of a plurality of devices is connected to the network, and
   the authentication controller performs the second code authentication with a predetermined controller among the first controller and the other controllers through the network every time it is detected that the voltage becomes lower than or equal to the predetermined value.

4. A theft prevention method performed by an authentication controller that performs first code authentication between the authentication controller and a driving power controller which is configured to initiate starting of driving power on a condition that the driving power controller receives from the authentication controller a signal indicative of a success of authentication, the method comprising steps of:
   detecting a voltage supplied from a power supply; and
   when a result of the detection is lower than or equal to a predetermined value, performing second code authentication with a first controller that controls a device different from the driving power controller, in addition to the first code authentication with the driving power controller, and sending the signal indicative of the success of authentication to the driving power controller, wherein the driving power controller is implemented as a first physical device separate from the authentication controller and the first controller, the authentication controller is implemented as a second physical device separate from the driving power controller and the first controller, and the first controller is implemented as a third physical device separate from the driving power controller and the authentication controller.

5. The theft prevention method according to claim 4, wherein
the first controller is connected to a network which is different from a circuit of the driving power controller and the authentication controller and to which another controller is connected.

6. The theft prevention method according to claim 5, wherein
the other controller included in each of a plurality of devices is connected to the network, and
the step of performing second code authentication performs the second code authentication with a predetermined controller among the first controller and the other controllers through the network every time it is detected that the voltage becomes lower than or equal to the predetermined value.

* * * * *